(12) United States Patent
Ohlsson

(10) Patent No.: US 7,520,749 B2
(45) Date of Patent: Apr. 21, 2009

(54) INTERVENTIONAL SIMULATION DEVICE

(75) Inventor: Fredrik Ohlsson, Torslanda (SE)

(73) Assignee: Mentice AB, Göteborg (SE)

( * ) Notice: Subject to any disclaimer, the term of this patent is extended or adjusted under 35 U.S.C. 154(b) by 410 days.

(21) Appl. No.: 10/538,006

(22) PCT Filed: Dec. 3, 2003

(86) PCT No.: PCT/SE03/01891

§ 371 (c)(1),
(2), (4) Date: Oct. 27, 2005

(87) PCT Pub. No.: WO2004/051602

PCT Pub. Date: Jun. 17, 2004

(65) Prior Publication Data

US 2006/0127864 A1 Jun. 15, 2006

(30) Foreign Application Priority Data

Dec. 3, 2002 (SE) .................... 0203568

(51) Int. Cl.
*G09B 23/28* (2006.01)
(52) U.S. Cl. .................................. 434/262
(58) Field of Classification Search ............... 434/262, 434/265, 267, 270, 271, 272, 273, 274, 275
See application file for complete search history.

(56) References Cited

U.S. PATENT DOCUMENTS 5,805,140 A * 9/1998 Rosenberg et al. .......... 345/161
5,828,197 A * 10/1998 Martin et al. ............... 318/567
5,882,206 A * 3/1999 Gillio ......................... 434/262
6,106,301 A    8/2000 Merril
6,267,599 B1   7/2001 Bailey
6,470,302 B1 * 10/2002 Cunningham et al. .......... 703/7
6,785,572 B2 * 8/2004 Yanof et al. ................. 600/427
6,857,878 B1 * 2/2005 Chosack et al. ............. 434/267
7,056,123 B2 * 6/2006 Gregorio et al. ............ 434/272
7,156,664 B2 * 1/2007 Wallaker .................... 434/262

FOREIGN PATENT DOCUMENTS

EP     0 970 714 A2         1/2000
WO     WO99/39317     *     8/1999
WO     WO 99/39317 A1       8/1999

* cited by examiner

*Primary Examiner*—Kurt Fernstrom
(74) *Attorney, Agent, or Firm*—Harness, Dickey & Pierce, P.L.C.

(57) ABSTRACT

The present invention relates to a device (100) in a simulation system for simulating an interventional operation. The device (100) is arranged to receive a number of real instruments, preferably at least two. The device (100) comprises a number of moveable carriages (16A-16C) corresponding to the number of the real instruments. The device (100) further comprises a track (20) and an interconnecting member (26). The interconnecting member (26) interconnects the carriages (16A-16C) serially. Each carriage (16A-16C) is provided with an opening for enabling reception of the instruments. Each carriage (16A-16C) further comprises members to receive and lock at least one instrument, and members for receiving a movement from the instrument and generating a force, fed back to the instrument with respect to a simulation characteristic.

34 Claims, 10 Drawing Sheets

INTERVENTIONAL SIMULATION DEVICE

TECHNICAL FIELD

The present invention relates to a device in a simulation system for simulating an interventional operation and most preferably endovascular operations.

BACKGROUND OF THE INVENTION

Principles of adult education, tenets of experiential learning, and theories addressing the development of expertise have all underscored the critical role experience plays in the learning process.

State-of-the-art simulations can be successfully included in contemporary surgical and medical education to offer trainees and practicing physicians the requisite learning experiences based on these educational underpinnings. All learners can be offered opportunities to acquire the essential skills and to achieve specified competency levels based on standardized learning experiences. Simulations can be used to facilitate learning through the evaluation of performance and provision of immediate, individualized, and detailed feedback. Simulations offer controlled settings that allow repetition until the defined performance levels are achieved, decrease stress levels of learners, increase the confidence levels of learners, and increase safety in real settings by assuring the achievement of technical competence prior to work on patients.

Practicing physicians can improve their skills and can learn new procedures emerging as a result of advances in science and technology through educational interventions involving the use of simulations. In addition, the use of simulations can help address practical issues, such as the demands on faculty time, by providing trainees the opportunities for independent learning and practice. The current emphasis on accountability and on assurance of the quality of health care may also be addressed through the use of such simulations and data on outcomes can be used to assure the public of the competence of physicians.

Simulations should be considered an essential part of every contemporary educational program that addresses technical skills development. They can be used to ensure effective teaching and learning, to provide valid and reliable means of assessment of the skills of learners, to yield information on specific weaknesses that require improvement, and to create individual profiles of the technical ability of learners. In order to achieve the desired results, specific curricula should be developed based on principles of adult education, experiential learning, and effective feedback. Such simulations may also be used in programs of continuing professional education and certification.

The initial investment of resources needed for the development and acquisition of simulations and for the creation of training programs that incorporate them effectively in educational models is readily offset by the numerous advantages resulting from expeditious performance of procedures in the operating room, enhancement of patient safety, and decrease in the faculty time needed to teach learners various technical skills. Such simulations may also be used to assess the effectiveness of educational efforts and even to select individuals for training. Thus, the simulations have the potential to make a major impact on programs of surgical and medical education of the future.

As a result of the rapid developments within the computer technique, simulations, especially for the purpose of surgical and medical education, have improved considerably. However, the presently known apparatus and methods do not allow a full range simulation of different instruments used and methods.

U.S. Pat. No. 6,106,301 discloses an interventional radiology interface apparatus and method interfaces peripherals in the form of mock medical instruments to a medical procedure simulation system to enable performance of a medical procedure on a virtual patient. The Interface apparatus includes a guide wire, catheter and sheath, an injection syringe, an inflation syringe and a foot switch to realistically simulate the instruments utilized during an actual medical procedure. A user manipulates guide wire, catheter and sheath peripherals to traverse an arterial network toward a simulated blockage shown on the medical procedure simulation system display. The foot switch controls the display to provide a fluoroscope image showing the position of the guide wire, catheter, sheath and blockage within the arterial network. The injection syringe may be manipulated to simulate injections of contrast fluid or other pharmaceutical substances through the catheter or sheath into the virtual patient. When a guide wire is positioned past the simulated blockage within the arterial network, the catheter is exchanged for a balloon-tipped angioplasty catheter, and the inflation syringe is manipulated to simulate inflation of the balloon to reduce the blockage. In addition, the interface apparatus may apply force feedback to the guide wire and catheter to simulate forces encountered by these instruments during an actual medical procedure. The interface apparatus measures peripheral manipulation and transfers these measurements via a processor to the medical procedure simulation system to enable simulation of the medical procedure.

U.S. Pat. No. 6,267,599 discloses a system for producing highly realistic, real-time simulated operating condition for interactive training of persons to perform minimally invasive surgical procedures involving implements that are inserted and manipulated through small incisions in the patient. The virtual environment for this training system includes a housing with small opening. An implement simulating a surgical implement is inserted into the opening and manipulated relative to the housing. A movement guide and sensor assembly monitors the location of the implement relative to the housing and provides data about the implement's location and orientation within the housing.

The reported data is interpolated by a computer processor, which utilizes a database of information representing a patient's internal landscape to create a computer model of the internal landscape of the patient. With reference to this computer model, the processor controls the occurrence of force feedback opposing the motion of the implement. A two-dimensional image representing the implement, as it would appear within the patient is generated by a processor-controlled video imaging system based on the computer model of the patient's internal landscape. This computer image of the implement is then merged with a video image loop of a patient's internal landscape as it appears through a heartbeat and breathing cycle, and the merged image is displayed on a video display.

The combined elements of real-time visual representation and interactive tactile force feedback provide a virtual training simulation with all elements of actual operation conditions, minus a live patient. The system according to the invention described in U.S. Pat. No. 6,267,599 cannot be used for simulating several instruments simultaneously and in real time.

WO 99/39317 describes an interface device for handling several instruments through the same interface for simulating instrumental movement and rotation in a medical procedure simulation system. This system uses specially manufactured mock instruments that fit into the interface device and the instruments will be engaged and locked by carriage assemblies prepared to receive their specific respective instrument type. The solution with mock instruments and special order of insertion makes this system unrealistic and complex for the user, since the user needs to know the configuration of the carriage assemblies and the correct insertion order according to this configuration.

SUMMARY OF THE INVENTION

One object according to the best embodiment of the present invention is to provide an interface device for simulation of interventional operations and most preferably endovascular operations, which allows simultaneous simulation of different instruments. The device of the preferred embodiment of the invention provides more accurate control.

Other advantages according to the best embodiments include:
- The user can work with at least three independent instruments at the same time.
- Real instruments can be used.
- Through a better feedback system a more realistic feeling is obtained.
- instruments can be inserted and withdrawn as in real operations, without special interaction or control from the user.

For these reasons, the initially mentioned device is arranged to receive a number of real instruments, preferably at least two real instruments. The device comprises: a number of moveable carriages corresponding to the number of the real instruments, a track, and an interconnecting member. The interconnecting member interconnects the carriages serially. Each carriage is provided with an opening for enabling reception of the instruments. Each carriage further comprises members to receive and lock at least one instrument. Each carriage further comprises members for receiving a movement from the instrument and generating a force, fed back to the instrument with respect to a simulation characteristic.

In one preferred embodiment of the invention, the opening is provided within the interconnecting member.

In another preferred embodiment, the interconnecting member is a telescopic pipe, allowing insertion of nested instruments.

In a further preferred embodiment each carriage comprises a detecting arrangement for detecting the type of the instrument inserted through the interconnecting member, which simplifies the handling of the instrument.

In yet a further preferred embodiment, the device is connected to a control unit to measure the movement of the carriages and control the movement by means of a speed control loop and a position control loop, to provide accurate feedback.

In one preferred embodiment, the carriages are arranged to move along the track.

In a further preferred embodiment, the carriage has an actual position and a simulated position. The actual carriage position determines the simulated carriage position from a scale table.

In another preferred embodiment, the carriage is connected through a transmission for driving along the track. The carriage is provided with a crank block, which is arranged in a torque wheel. The crank block is provided with a mating surface, which is pressed towards a collet that grips the instrument wire, in a nested manner.

In another preferred embodiment, the force between a suspended plate and a chassis. The chassis is arranged on the carriage, is gauged by means of a force sensor.

In another preferred embodiment, the carriage is provided with a detecting member, which detects presence of an instrument in the carriage.

In a further preferred embodiment, the detecting member is arranged to detect the type of each instrument.

In another preferred embodiment, the instruments are categorized into the types with respect to at least one of the following characteristics: thickness, color, structure, material, identity and/or bar code.

In yet another preferred embodiment, the detecting member is an optical sensor.

In yet another preferred embodiment, a first interconnecting member is arranged between the opening and the first carriage. A second interconnecting member is arranged between the first carriage and the second carriage. A third interconnecting member is arranged between the second carriage and the third carriage.

In another preferred embodiment, the device comprises a processing unit for measuring a longitudinal movement and a movement of rotation of the instrument.

In another preferred embodiment, the device comprises a processing unit, which provides force feedback in the longitudinal direction and in the direction of rotation, of the instrument.

Most preferably, the instruments are real instruments, with one simulated end. This allows testing different commonly available instruments.

In yet another preferred embodiment, the device comprises a locking member, for clamping an instrument. The locking member is attached to a central wall. The locking member may comprise a member for applying a torque.

In yet another preferred embodiment, the crank block is provided inside a torque wheel. The crank block moves in a longitudinal direction and is fixed in the direction of rotation, relatively to the torque wheel.

The invention also relates to a method of simulating an interventional operation by means of a device in a simulation system is used. The device is arranged to receive a number of instruments, preferably at least two instruments. The device comprises a number of moveable carriages corresponding to the number of the instruments, a track and an interconnecting member. The method comprises the steps of inserting a number of instruments into the device, receiving the instruments by each carriage, which are interconnected serially, by receiving and locking at least one instrument. Each carriage further comprises members for receiving a movement from the instrument and generating a force fed back to the instrument with respect to a simulation characteristic.

According to one aspect of the invention, a simulator system, preferably an interventional procedure simulator system is provided. The simulator system comprises at least a first and a second displaceable member and a control system. The control system comprises: a first controller (F1(s)), controlling the speed of the first displaceable member (16A-16C) towards a set value (CDV). The control system further comprises a second controller (F2(s)), for combining an error in a position (CAP) and a speed of the second, previous displaceable member (PCAV) to a set speed for the first member. The second controller (F2) controls CDV=C1*(CAP−PCAP)+C2*PCAV, wherein C1 and C2 are constants.

According to another aspect of the invention, a simulator system, preferably an interventional procedure simulator system is provided. The simulator system comprises an arrangement for receiving an instrument to be simulated. The arrangement comprises identification means for identifying the instrument.

In yet another preferred embodiment, the arrangement for detecting an instrument, comprise at least one IR diode and at least one IR phototransistor.

In one preferred embodiment the identification means consists of at least one of thickness, color, structure, material of the instrument, identity and/or bar code.

According to another aspect of the invention a simulator system, preferably an interventional procedure simulator system is provided. The simulator system comprises members to receive and lock an instrument to be simulated, and a control unit comprising a force sensor. The control unit controls towards a demand force value, DF. A force that a user experiences in the instrument is measured with the force sensor and a signal from the force sensor is fed back in a force feedback control loop towards a set force.

According to another aspect of the invention a simulator system, preferably an interventional procedure simulator system, an arrangement for generating a resistance in a simulated instrument is provided. The arrangement comprises a control unit and a force sensor. The arrangement further comprises a force feedback control loop for controlling an actuator device for driving an instrument receiver member in a direction. The arrangement further comprises an inner force control loop. The force sensor is arranged for measuring the resistance. A signal from the force sensor is fed back in the inner force control loop that controls, with a loop-amplification, K, provided by the control unit, towards a set force value, SF, provided by the control unit and the inner force control loop controlling the actuator.

In one preferred embodiment, the control unit controls the loop amplification, K, to achieve a resistance.

In one preferred embodiment, the control unit controls the set force, SF, to achieve a resistance.

According to another aspect of the invention a simulator system, preferably an interventional procedure simulator system is provided. The simulator system comprises an arrangement for generating a resistance in a simulated instrument. The simulator system further comprises an arrangement for receiving and fixing a part of an instrument in a device for measuring instrument movement and feeding back a force to the instrument. The arrangement comprises a member for clamping the instrument. The arrangement comprises a crank block, which is arranged in a torque wheel, the crank block is movable in a longitudinal direction inside the torque wheel. The crank block is provided with a mating surface, which is pressed towards a collet that grips the instrument part.

BRIEF DESCRIPTION OF THE DRAWING

In the following the inventions will be described in a non-limiting way with reference to the best embodiment of the invention, in conjunction with enclosed drawings, in which.

DESCRIPTION OF THE PREFERRED EMBODIMENTS

In the following, the best embodiment of the invention and some modifications thereof, will be described in detail and with reference to the enclosed drawings. Some examples of other possible embodiments will also be described.

Figure 3:
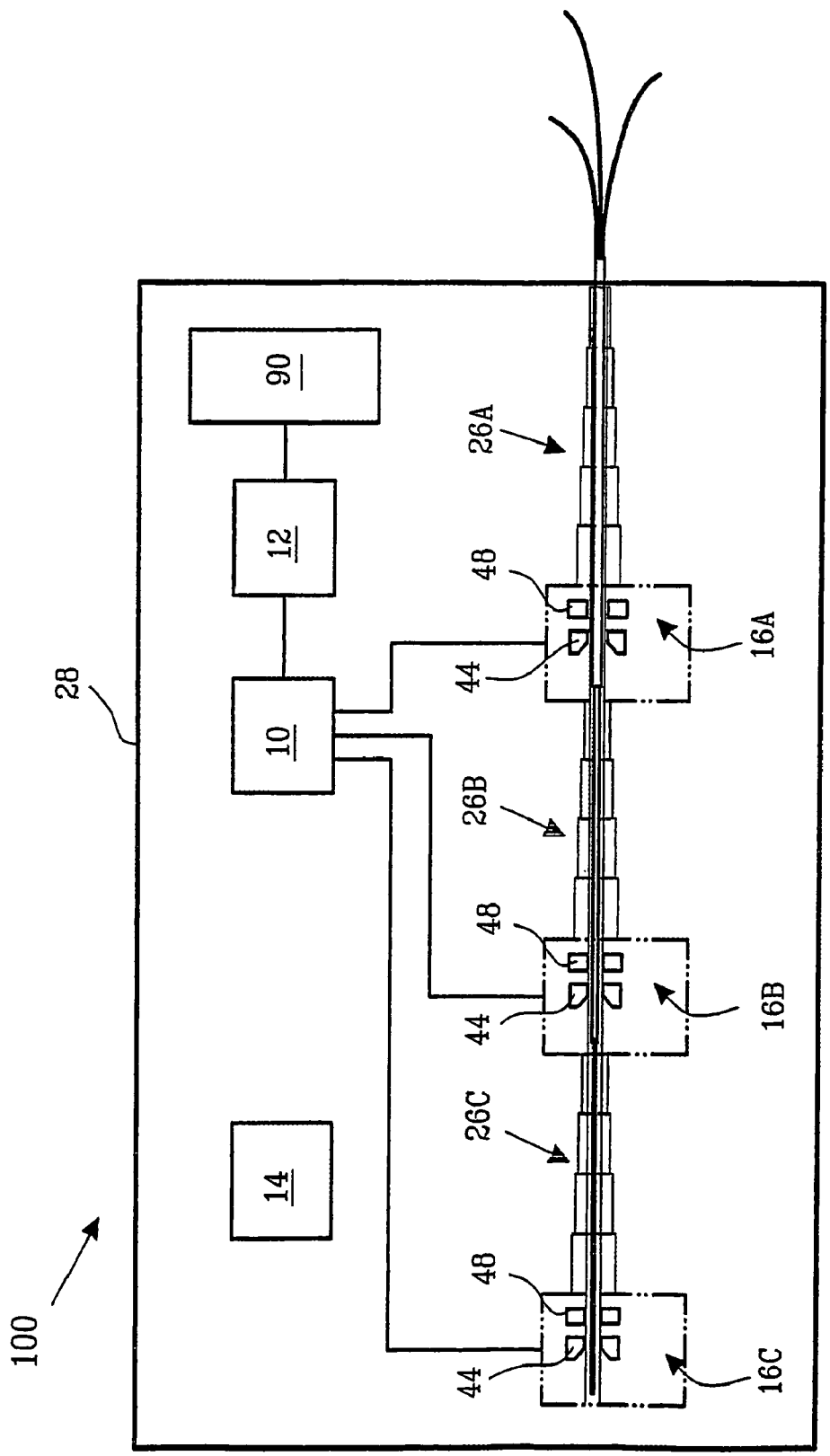
FIG. 3 shows the carriages schematically.

The interface device 100 according to the best embodiment of the present invention, as shown in FIG. 3, comprises:

Processing units 10 arranged on corresponding Printed Card Boards, PCBs.

A communication unit 12.

A power supply 14.

At least three carriages 16A-16C. Each carriage 16 having the same technical features. The carriages 16A-16C are arranged to lock different types of instruments, which is described later on.

Motors and transmission 18 for driving the carriages 16A-16C.

A track 20 on which the carriages 16A-16C can move. In this embodiment it is a common track, but in other embodiments it can for example be three tracks in parallel or the like.

An opening 22 provided with entry pipes 24.

Figure 1:
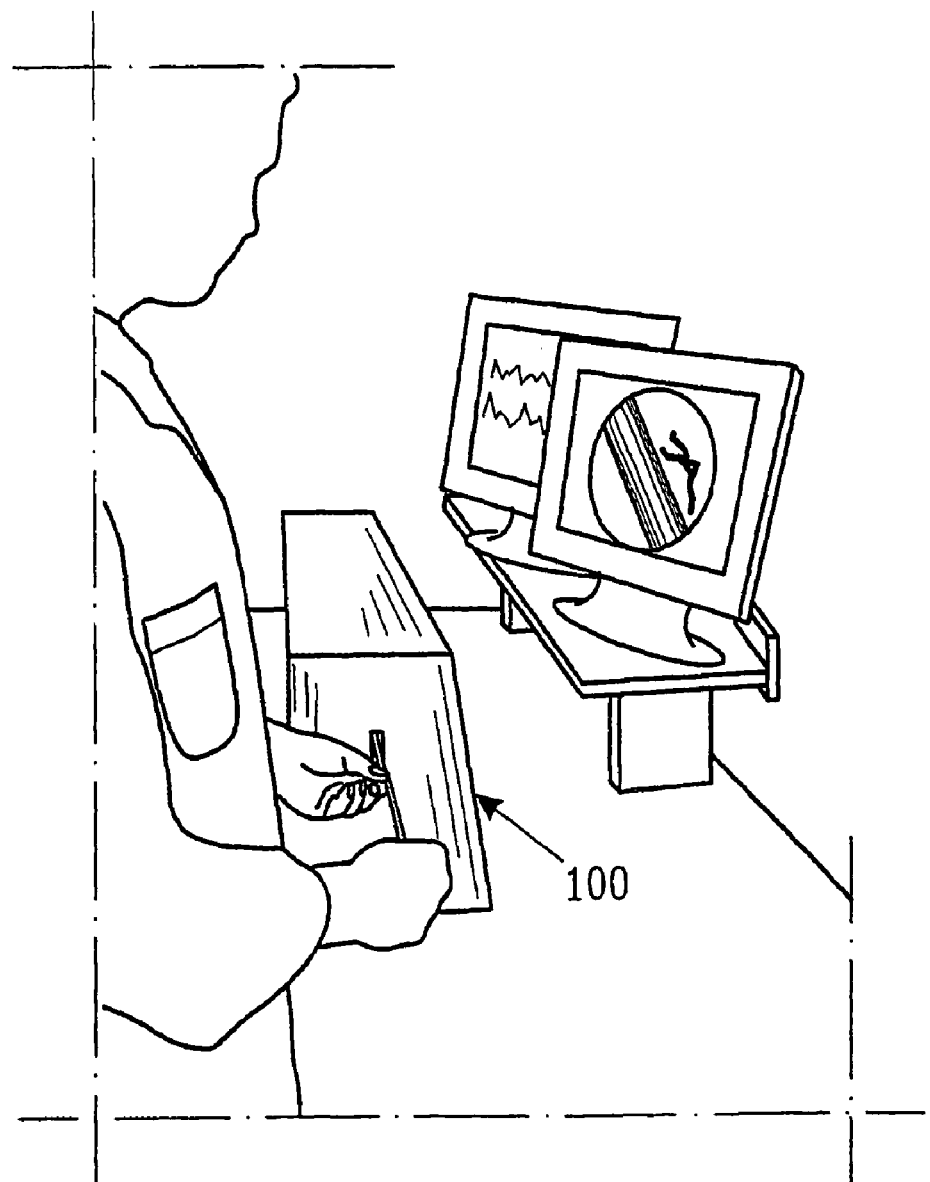
FIG. 1 shows a general overview of the device according to the present invention, when used.
Figure 2:
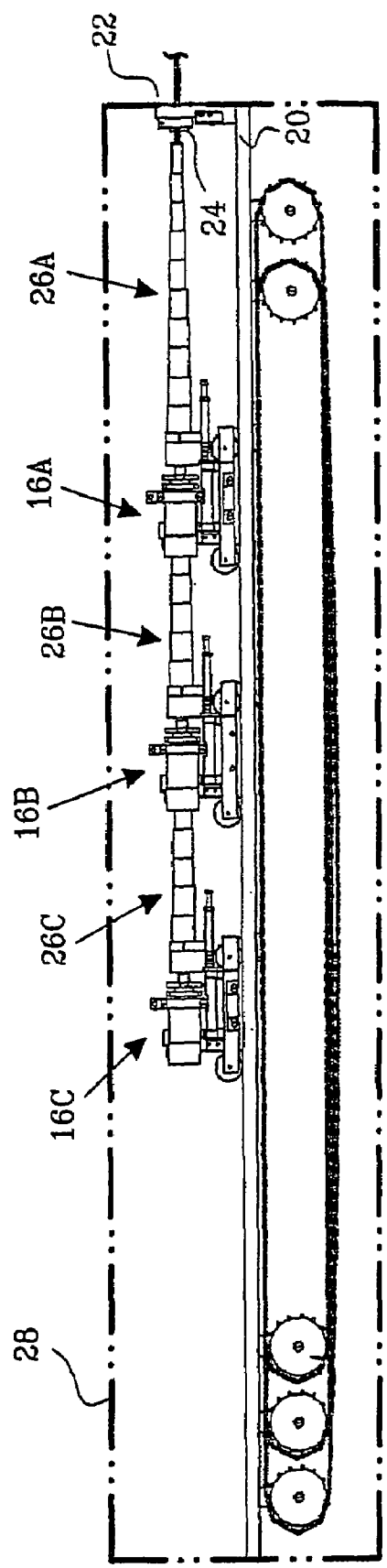
FIG. 2 shows a sectional view of the device.

Interconnecting members 26, in form of telescopic pipes 26A-26C, see FIG. 2.

A cover 28.

A control unit 30, in form of software in a PC.

Figure 4:
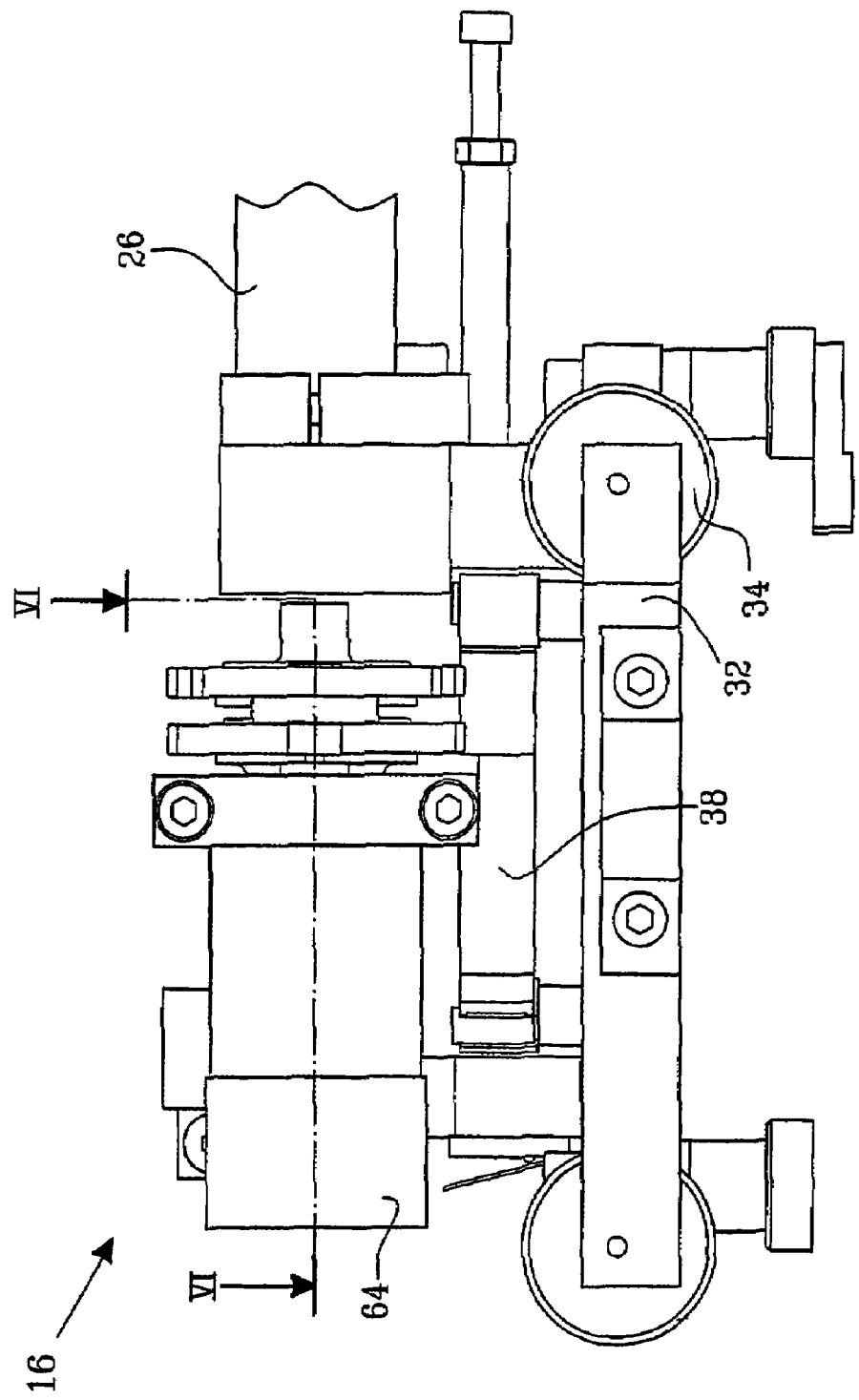
FIG. 4 shows a sectional view of a carriage.
Figure 5:
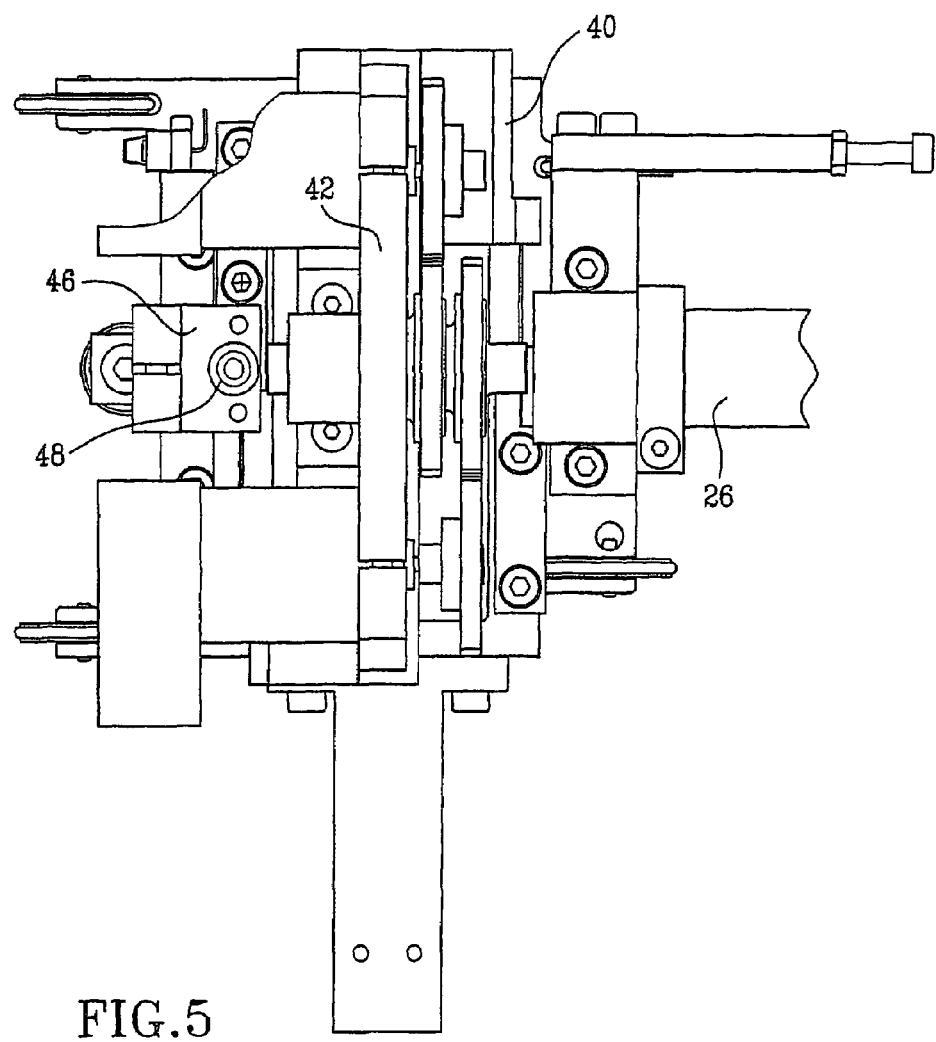
FIG. 5 shows a lateral view of a carriage.

Each carriage 16A-16C comprises:

A chassis 32 provided with wheels 34. In other embodiments the chassis can be provided with runners, slide bushings or the like. The chassis 32 is attached to a transmission 18, preferably a gear belt transmission, through a connector pin for driving along the track 20. In other embodiments chain transmission, wire transmission or pneumatic cylinder transmission can be used. A suspended plate 38 is attached to the chassis 32 through a spring suspension. One of the springs is a sensor, in form of a load cell, which measures the force between the suspended plate 38 and the chassis 32. This sensor is henceforth called the force sensor 40. A substantially, centrally provide wall 42, is arranged on the suspended plate 38, see FIG. 4 and FIG. 5.

The function of each carriage 16A-16C is to detect when an instrument has passed through the carriage, by means of a detecting member 48, determine the type of the instrument and if a decision is made from the control unit 30, to lock the instrument. The locking mechanism, further described later on, is activated by the locking member 44 to provide a locking.

Connections for the interconnecting member 26 are arranged at the opening 22 and the outlet 46. In the best embodiment of the present invention the interconnecting members are in form of telescopic pipes, but can also be in form of elastic pipes or the like, for example made of rubber or non-rigid plastic. The interconnecting members 26 make it possible to operate with three interacting nested instruments. The interconnecting members 26 moves between the carriages 16, see FIG. 2. The first interconnecting member 26A, is arranged between the opening 22 and the first carriage 16A, the second interconnecting member 26B is arranged between the first carriage 16A and the second carriage 16B and the third interconnecting member 26C is arranged between the second carriage 16B and the third carriage 16C.

Figure 6:
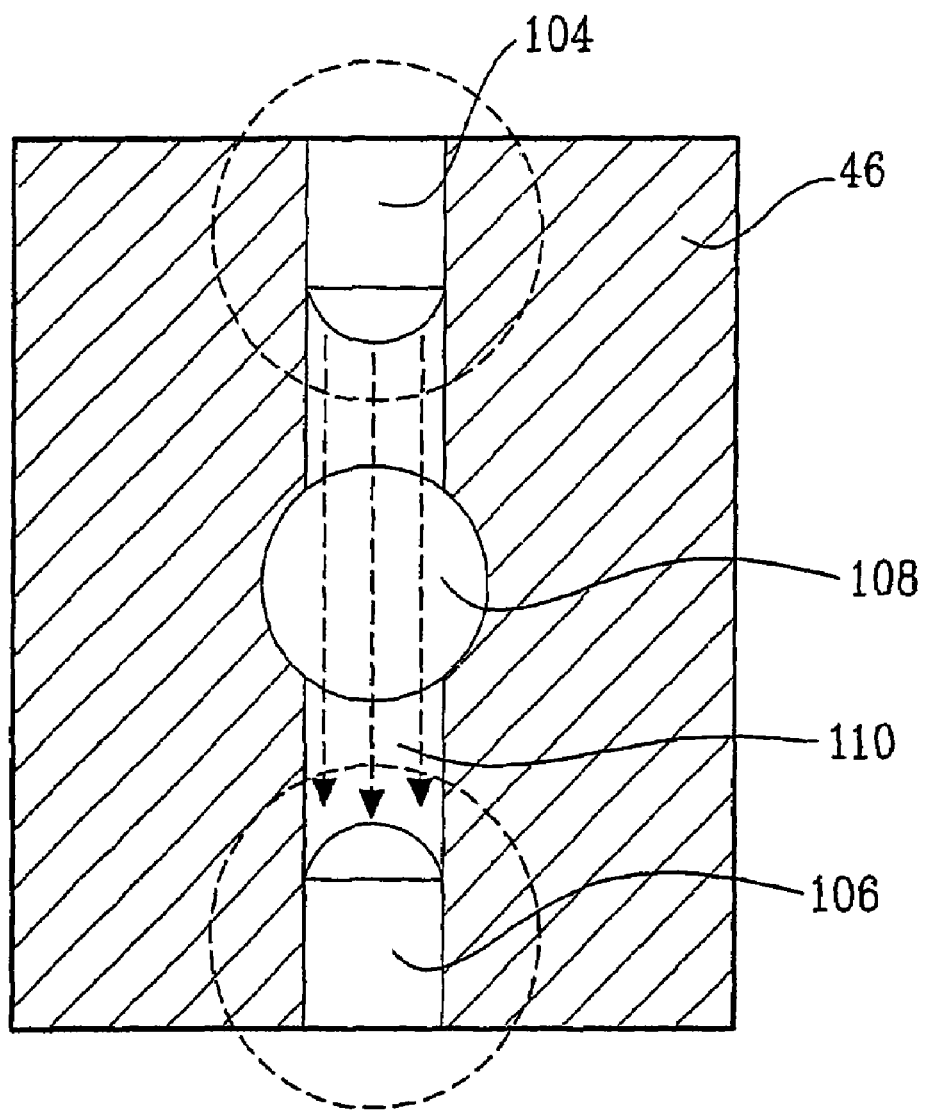
FIG. 6 shows a front view of the optic sensor.

The detecting member 48, in form of an optical sensor, detects presence of an instrument in the carriage 16. The optical sensor 48 can furthermore determine which type the instrument belongs to. The instruments are categorized into said types according to thickness, and/or other identity signs, for example color, structure and/or material of the instrument. In another embodiment the instruments can be provided with bar codes and the detecting member can be arranged with a bar-code reader. The detecting member 48 is arranged at the outlet 46 and comprises an IR diode 104 and an IR phototransistor 106, which are arranged at each sides of the tool passage 108, see FIG. 6, through which the instruments passes. The light travels from the IR diode 104 to the IR phototransistor 106 through the light channel 110. The IR diode 104 emits IR light through voltage supply and current limiting with a resistance. The light is led via the light channel 110 to the IR phototransistor 106, which is more or less permeable for current, depending on how much light that reaches it. When there is no instrument in the tool passage 108, a maximal amount of light reaches the IR phototransistor 106. When an instrument is present in the light channel 110, it blocks the light flow to the IR phototransistor 106 and hence less light reaches it. The more light that reaches the IR phototransistor 106, the more current the IR phototransistor 106 let through and the higher the voltage over the resistance gets. An A/D transducer measures that voltage and the measurement test result is sent to the control unit 30.

The locking member 44 is arranged to clamp up an instrument, and is attached in the central wall 42. The same locking member 44 can provide a torque on an instrument, such that it provides force-feedback to the instrument in the direction of rotation.

Subsequent to the detection and locking of the instrument/instruments is/are, the carriage 16 follows the users movement of the instrument. This is done by means of the transmission 18 and the control electronic, and is so controlled that a demand force is obtained from the control unit 30. The force-feedback is further described later on.

Figure 7:
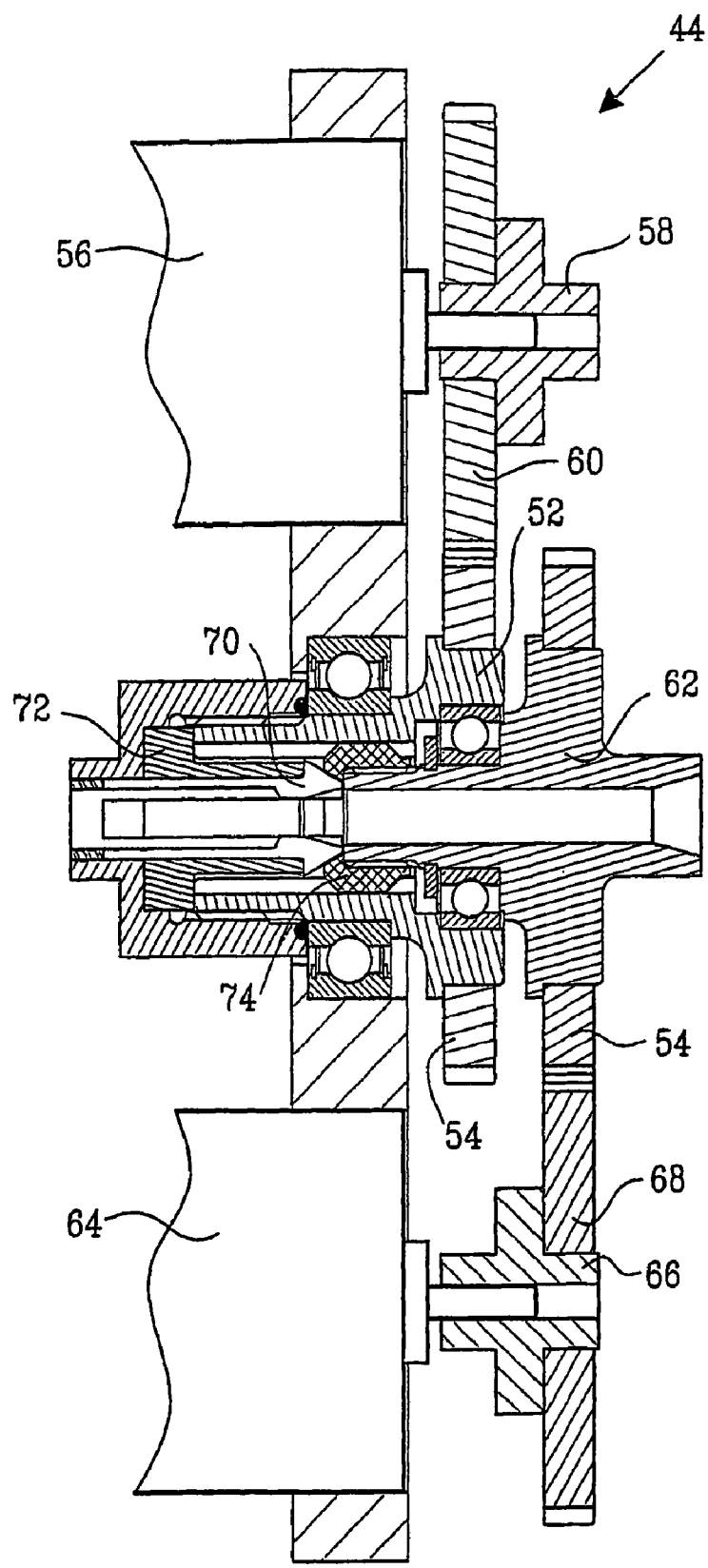
FIG. 7 shows a lateral view of the locking member.

FIG. 7 shows the locking member 44 according to the best embodiment of the present invention. A central unit 50 with a torque wheel 52 is attached to the central wall 42 by means of a bearing, for example a ball bearing or a roller bearing. The torque wheel 52 is provided with a gear ring 54. A torque motor 56 with a motor hub 58 and a torque motor gear wheel 60, is arranged to drive the torque wheel 52. A lock wheel 62, is attached to the torque wheel 52 through a bearing, for example a ball bearing, roller bearing, needle bearing or a polymer bush. Further, a lock motor 64, with motor hub 66 and lock motor gear wheel 68, is arranged to drive the lock wheel 62. The locking member 44 further comprises a collet 70, which grips the instrument, and a collet seat 72, in which the collet 70 is arranged.

A crank block 74, which is arranged inside the torque wheel 52, can move in a longitudinal direction, but is fixed in the direction of rotation, relatively the torque wheel 52. Said crank block 74 is provided with wings. The wings run in a guide track, which is arranged in the torque wheel 52. The crank block 74 is provided with a mating surface, which is pressed towards the collet 70 that grips the instrument wire. Instead of the crank block 74 other chucking principles can be used.

The locking member 44 further comprises an inner, lock wheel 62, which is attached through bearings, for example ball bearings, needle bearings or the like, to the outer, torque wheel 52. The torque wheel 52 and the lock wheel 62, respectively, are provided with gear rings 54. The lock wheel 62 rotates inside the torque wheel 52 and is provided with a thread. The thread affects the crank block 74, which is fixed in the direction of rotation in the torque wheel 52, but runs freely in longitudinal direction. The collet 70 is provided at the back edge of the lock wheel 62. The entire central unit 50 is arranged with two openings 22 in the center, through which the instrument can pass.

Two motors, the torque motor 56 and the lock motor 64, are fixed to the central wall 42. The motor axis are provided with motor gear wheels 60, 68, which goes against the gear rings 54 of the torque motor 56 and the lock motor 64.

In the initiation sequence of the interface device, the carriages 16 are positioned closely in a row and towards the instrument entrance side. The user inserts an instrument or a tool in the entry pipe 24, through the first interconnecting member 26A, into the first carriage 16A and through its central unit 50 and out though its outlet 46 there the detecting member, in form of e.g. an optical sensor 48 detects the instrument's presence and type. The control unit 30 decides from the detected instrument type, whether to lock the instrument or not. If the first carriage 16A does not lock the instrument, the instrument passes through the first carriage 16A and out into the second interconnecting member 26B and further towards the second carriage 16B.

If the first carriage 16A locks the instrument, the locking sequence starts. Thus, the torque wheel 52 is fixed through the torque motor 56. After that the lock wheel 62 is rotated by means of the lock motor 64, so that the crank block 74 is pressed towards the collet 70, which clamps around the instrument. The locking member 44 and the suspended plate 38 are consequently fixed to the instrument.

After the locking sequence follows the force and torque control. A force controller control, with high frequency from the force sensor 40, the position of the chassis 32 so that a given set force is maintained in the force sensor 40. The force is transferred to the instrument. The user feels this set force in the instrument, which gives force-feedback in the longitudinal direction. The torque control sets out a set torque, by means of the torque motor 56, which causes force-feedback in the direction of rotation. The set force and set torque are determined from the simulation. Information about the position of the instruments in the longitudinal direction and in the direction of rotation is send continuously to the simulation unit 90.

If the user withdraws the instrument, so that the carriage 16 passes its initial position, the unlocking sequence starts. The unlocking sequence is carried out in a reversed order as the locking sequence. After the unlocking sequence, the instrument runs freely in the carriage 16.

All the carriages 16A-16C operate in the same way. An unlocked carriage follows the nearest previous carriage's movements in a longitudinal direction along the track 20. To make the movement of the carriage flexible and reduce the control error, an inner, speed control loop 86 and an outer, position control loop 88 are used. The purpose of the speed control loop 86 is to control the speed of the carriages 16 with respect to each other. The purpose of the position control loop 88 is to keep the distance of the carriage 16 to previous carriage 16 constant.

Figure 8:
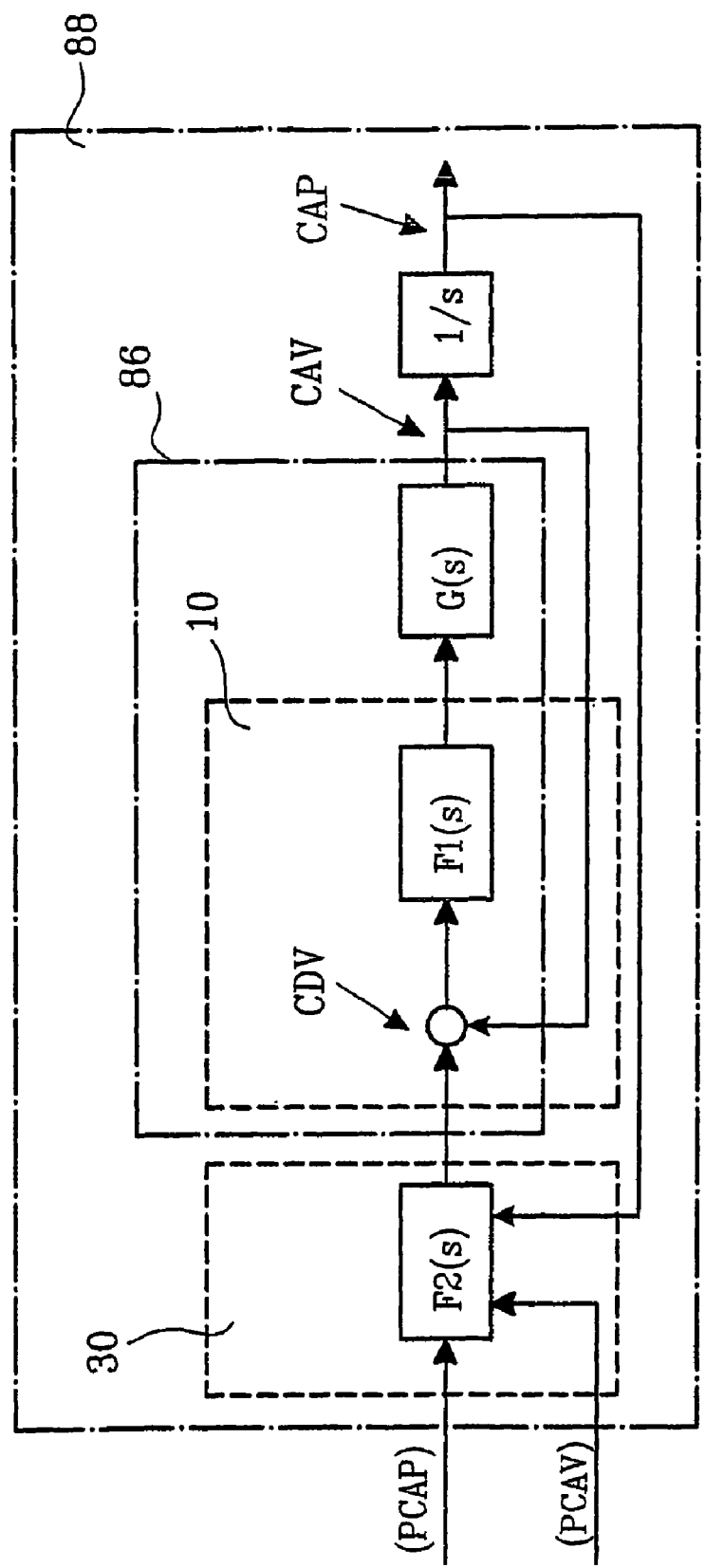
FIG. 8 shows a block diagram of the control system.

The block diagram of FIG. 8 shows the control system G(s). The system G(s) represents one of the carriages (16A-16C) driven by its longitudinal motor. F1(s) is a controller, which controls the speed of the carriage towards a set value, Carriage Demand Velocity, CDV. F1 is placed in one of the processor units 10 in the carriage 16. F1 gives a motor force to the longitudinal motor of the carriage 16.

Figure 9:
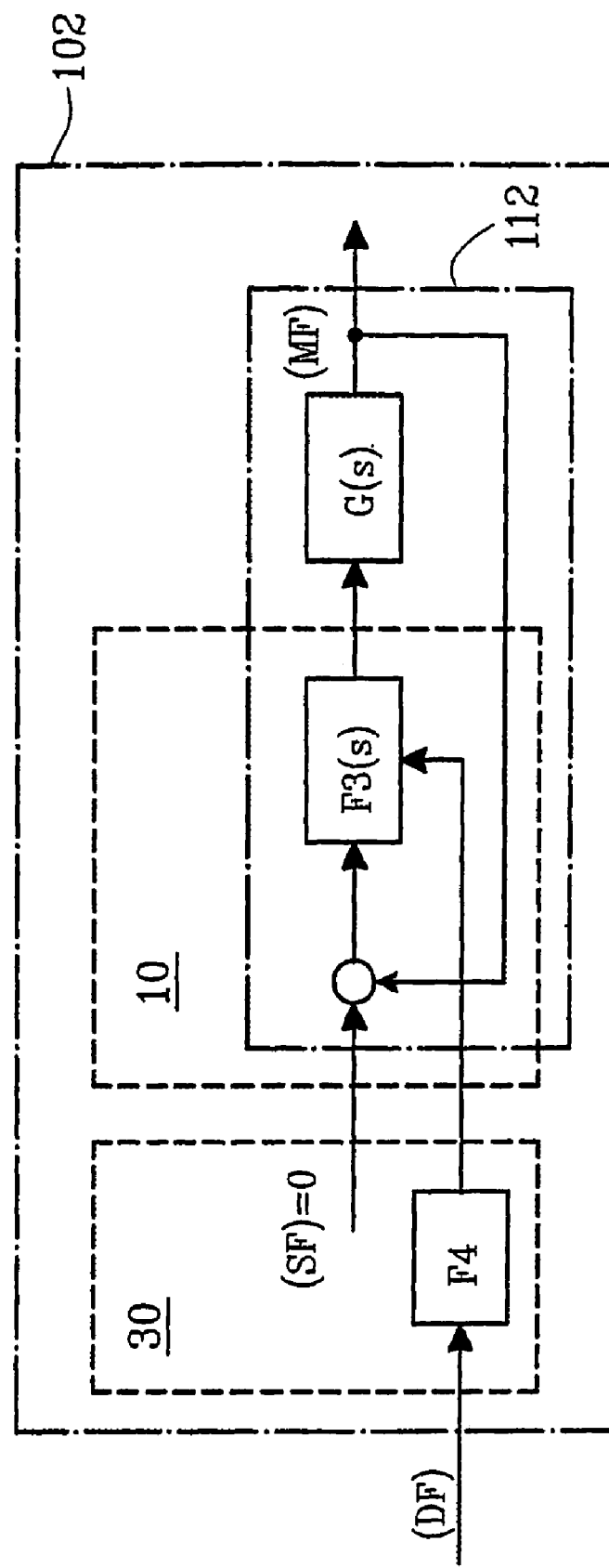
FIG. 9 shows a block diagram of the passive force feedback loop.

F2(s) is a controller, which is placed in the control unit 30, that is, in the PC. F2 combines the error in position, (Demand position-Carriage Actual Position, CAP) and the speed of previous carriage 16, (Previous Carriage Actual Velocity, PCAV) to a set speed for the carriage 16.

$$F2 \text{ controls } CDV=C1*(CAP-PCAP)+C2*PCAV$$

wherein:
CDV=Carriage Demand Velocity
CA=Carriage Actual Position
PCAP=Previous Carriage Actual Position
PCAV=Previous Carriage Actual Velocity
C1 and C2 are constants When the carriage 16 has locked an instrument or a tool, the control unit 30 controls towards a demand force value, DF. If the chosen demand force value for example is zero, the carriage 16 will be controlled so that the user experiences zero force in the instrument. If the user for example passes through a stenosis in a vessel, in the simulation, the user will feel a resistance in the instrument and then a desired demand force value is set to that resistance. To accomplish this, the force sensor 40 and the force feedback control loop 102 controls the longitudinal motor. The longitudinal motor drives the carriages 16A-16C along the track 20. The force that the user experience in the instrument is measured with the force sensor 40. The signal from the force sensor 40 is fed back in a control loop towards a set force, SF. This force feedback control loop 102 is shown in FIG. 9.

There are two types of force feedback that can be used "passive force feedback" and "active force feedback".

The control unit 30 sets the set force value, SF to the controller to be zero (SF=0). It determines the amplification in the inner, force control loop 112 (not the set force!) depending on the set force, SF, that is, the resistance that the simulation want the user to experience. This results in that the frictions in the system G(s) is compensated in a varying extent, determined from the loop amplification.

Example: With high amplification the user experience zero force. With low amplification, the user experience high resistance. In this way the friction will be what the user experience as resistance and a "passive force-feedback" is accomplished, see FIG. 9.

Thus is:

$$K=C1*(1-C2*DF)$$

wherein:
K=Loop amplification, F3(s)
DF=Demand Force,
C1 and C2 are constants.

Figure 10:
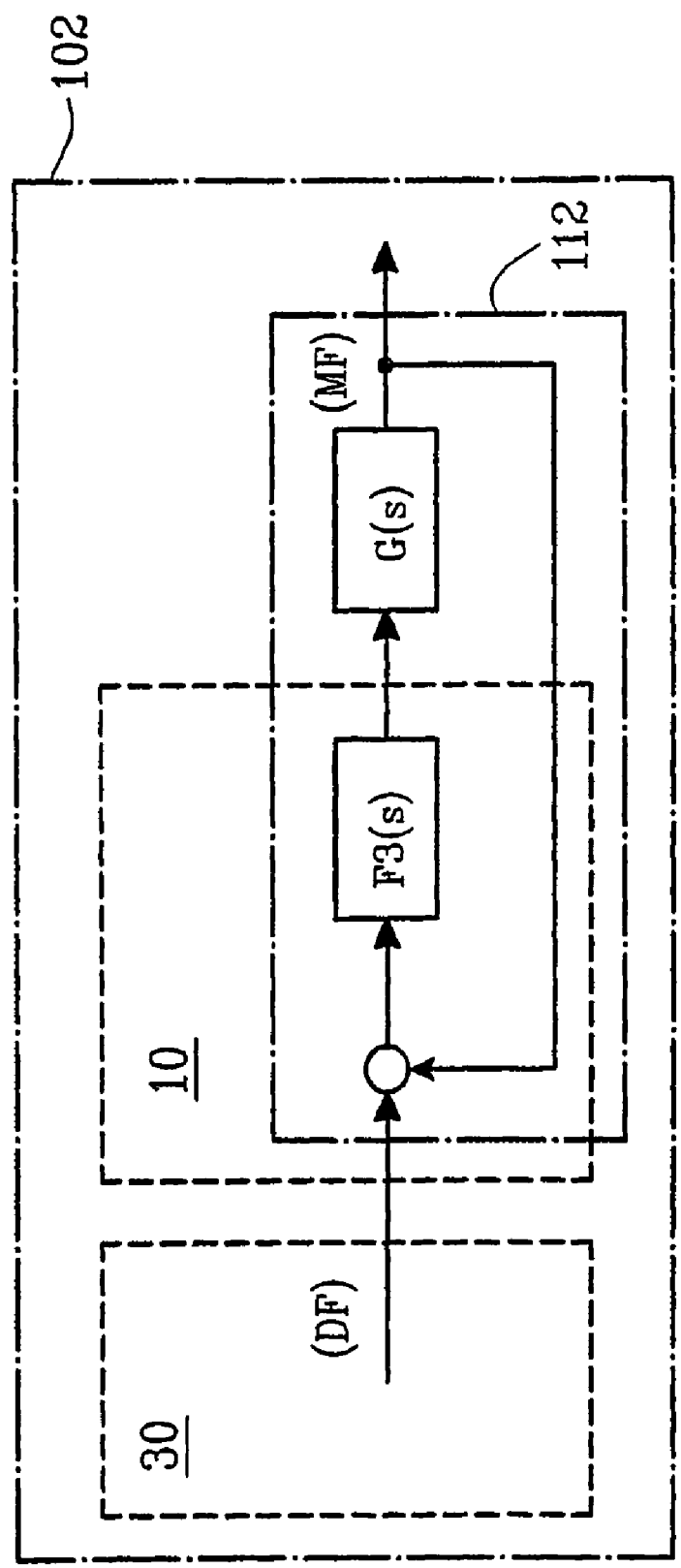
FIG. 10 shows a block diagram of the active force feedback loop.

To provide an "active force feedback" the Demand Force, DF/Set Force value, SF, must be controlled. In this case it is the longitudinal motor, which causes the resistance, see FIG. 10.

The user inserts the instrument for the endovascular operation, for example catheters, balloons, wires and the like, through the entry pipe 24 in the opening 22. The instrument is led through the interconnecting member 26 into the carriages 16A-16C, which carriages 16A-16C detects the instruments and grab hold of the instrument to be able to measure the movement of the instrument and give feedback to that movement.

The interface device with associated control unit 30 has the following function:
  Measure the movement of at least three separate nested instruments. These instruments are real, with one modification, soft and curved points are cut off. The measured movement consists of the longitudinal direction and the direction of rotation of the instrument point.
  Measure a pedal position, depressed and released.
  Measure the flow from a contrast syringe.
  Measure the pressure from a pressure pump for balloon blasting.
  Send measured values to the simulation unit 90.
  Receive forces and torque on the instruments respectively from the simulation unit 90.
  Give force-feedback in longitudinal direction and the direction of rotation of the instruments according to received forces and torques.
  Measure the signal from a special instrument.

A control program for a system and the device is described in a parallel application, entitled "AN INTERVENTIONAL SIMULATOR CONTROL SYSTEM" (SE 0203567-3) by the same applicant and incorporation herein through reference.

The present invention has now been described by means of the best embodiment and modifications thereof. However the invention is not limited to the illustrated embodiments, but variants and other modifications are also possible within the scoop of the claims. It is also possible to connect several devices to one or several PC's for simulating one simultaneous interventional procedure.

REFERENCE SIGNS processor unit 10
communication unit 12
power supply 14
carriage 16
first, second, third 16A-16C
transmission 18
track 20
opening 22
entry pipe 24
interconnecting members 26
first, second, third 26A-26C
cover 28
control unit 30
chassis 32
wheel 34
suspended plate 38
force sensor 40
central wall 42
locking member 44
outlet 46
detecting member 48
central unit 50
torque wheel 52
gear ring 54
torque motor 56
torque motor hub 58
torque motor gear wheel 60
lock wheel 62
lock motor 64
lock motor hub 66
lock motor gear wheel 68
collet 70
collet seat 72
crank block 74
speed control loop 86
position control loop 88
simulation unit 90
device 100
force feedback control loop 102
IR diode 104
IR phototransistor 106
tool passage 108 light channel 110
Inner force control loop 112

The invention claimed is:

1. A device in a simulation system for simulating an interventional operation, said device being arranged to receive at least two real instruments, comprising:
a number of moveable carriages corresponding to a number of said real instruments,
a track, and
an interconnecting member,
wherein said interconnecting member interconnects said carriages serially, each carriage being provided with an opening for enabling reception of said real instruments, each carriage further comprises:
a member for receiving and locking at least one real instrument, and
a member for receiving a movement from said instrument and generating a force feedback to said real instrument with respect to a simulation characteristic, and
wherein said opening is provided within said interconnecting member.

2. The device of claim 1, wherein said interconnecting member is a telescopic pipe.

3. The device of claim 1, wherein each carnage comprises a detecting arrangement for detecting a type of said real instrument inserted through said interconnecting member.

4. The device of claim 1, wherein said device is connected to a control unit to measure the movement of said carriages and control said movement by a speed control loop and a position control loop.

5. The device of claim 1, wherein said carriages are arranged to move along said track.

6. The device of claim 1, wherein said carriage has an actual position and a simulated position, which actual carnage position determines the simulated carriage position from a scale table.

7. The device of claim 1, wherein said carriage is connected through a transmission for driving along said track.

8. The device of claim 1, wherein said carriage is provided with a crank block, which is arranged in a torque wheel.

9. The device of claim 8, wherein said crank block is provided inside a torque wheel, which crank block moves in longitudinal direction and is fixed in the direction of rotation, relatively to the torque wheel.

10. The device of claim 8, wherein said crank block is provided with a mating surface, which is pressed towards a collet that grips the instrument wire.

11. The device of claim 8, wherein the force between a suspended plate and a chassis, which is arranged on said carriage, is measured by a force sensor.

12. The device of claim 1, wherein said carriage is provided with a detecting member, which detects presence of an instrument in the carriage.

13. The device of claim 1, wherein said detecting member is arranged to detect the type of each real instrument.

14. The device of claim 13, wherein said real instruments are categorized into said types with respect to at least one of the following characteristics; thickness, color, structure, material, identity and/or bar-code.

15. The device of claim 12, wherein said detecting member is an optical sensor.

16. The device of claim 1, wherein a first interconnecting member is arranged between said opening and the first carriage, a second interconnecting member is arranged between the first carriage and the second carriage and a third interconnecting member is arranged between the second carriage and the third carriage.

17. The device of claim 1, comprising a processing unit for measuring a longitudinal movement and a movement of rotation, of the instrument.

18. The device of claim 1, comprising a processing unit, which provides force-feedback in the longitudinal direction and in the direction of rotation, of the real instrument.

19. The device of claim 1, wherein an end or pat of said real instrument is simulated.

20. The device of claim 1, comprising a locking member, for clamping an instrument, which locking member is attached to a central wall.

21. The device of claim 1, wherein said locking member comprises a member for applying a torque.

22. The device of claim 1, wherein the device is an interventional procedure simulator system.

23. The device according to claim 22, comprising at least a first and a second displaceable member, and a control system comprising:
a first controller, controlling the speed of said first displaceable member towards a set value, and
a second controller, for combining an error in a position and a speed of said second, previous displaceable member to a set speed for the first member, wherein the second controller controls $CDV=C1*(CAP-PCAP)+C2*PCAV$, wherein $C1$ and $C2$ are constants.

24. The device according to claim 22, comprising an arrangement for detecting a real instrument to be simulated, wherein said arrangement includes an identffication device for identifying said real instrument.

25. The interventional procedure of claim 24, wherein said arrangement for detecting an instrument, comprises at least one IR diode and at least one IR phototransistor.

26. The interventional procedure of claim 24, wherein said identification device includes at least one of thickness, color, structure, material of said real instrument, identity and/or bar-code.

27. The device according to claim 22, further comprising members to receive and lock a real instrument to be simulated, and a control unit includes a force sensor, wherein said control unit controls towards a demand force value, and a force that a user experiences in the instrument is measured with the force sensor, and a signal from the force sensor is fed back in a force feedback control loop towards a set force.

28. The device according to claim 22, comprising an arrangement for generating a resistance in a simulated real instrument, the arrangement comprising a control unit, a force sensor, a force feedback control loop for controlling a actuator device for driving an instrument receiver member in a direction, and an inner force control ioop wherein said force sensor is arranged for measuring said resistance, a signal from the force sensor is fed back in said inner force control loop that controls, with a loop amplification provided by said control unit, towards a set force value provided by said control unit and said inner force control loop controlling said actuator, said system further comprises:
a device arranged to receive at least two real instruments,
a number of moveable carriages corresponding to a number of said real instruments,
a track, and
an interconnecting member,
wherein said interconnecting member is arranged to interconnect said carriages serially, each carriage having an opening for enabling reception of said real instruments, each carnage further comprises:
a member for receiving and locking at least one real instrument, and a member for receiving a movement from said instrument and generating a force feedback to said real instrument with respect to a simulation characteristic, and wherein said opening is provided within said interconnecting member.

29. The simulator system of claim 28, wherein said control unit controls said loop amplification to achieve a said resistance.

30. The simulator system of claim 28, wherein said control unit controls said set force to achieve a said resistance.

31. The device according to claim 22, comprising an arrangement for generating a resistance in an simulated real instrument, an arrangement for receiving and fixing a part of a real instrument in a device for measuring instrument movement and feeding back a force to said real instrument, said arrangement includes a member for clamping said real instrument.

32. The arrangement of claim 31, comprising a crank block, which is arranged in a torque wheel, said crank block being movable in a longitudinal direction inside said torque wheel.

33. The arrangement of claim 32, wherein said crank block is provided with a mating surface, which is pressed towards a collet that grips said instrument part.

34. A method of simulating a interventional operation by means of a device in a simulation system, said device being arranged to receive a at least two real instruments, comprising:

a number of moveable carriages corresponding to a number of said instruments, a track, and an interconnecting member, the method comprising the steps of:

inserting a number of real instruments into said device, and receiving said real instruments by each carriage, which are interconnected serially, each carriage having an opening for enabling reception of said real instruments, by receiving and locking at least one instrument, each carriage further includes a member for receiving a movement from said real instrument and a member for generating a force feedback to said real instrument with respect to a simulation characteristic, and said opening is provided within said interconnecting member.

* * * * *